3,325,674
MOVING TARGET DISPLAY INDICATOR
Benjamin Kazan, Los Angeles, Calif., assignor to Electro-Optical Systems, Inc., Pasadena, Calif.
Filed Jan. 3, 1964, Ser. No. 335,631
3 Claims. (Cl. 315—12)

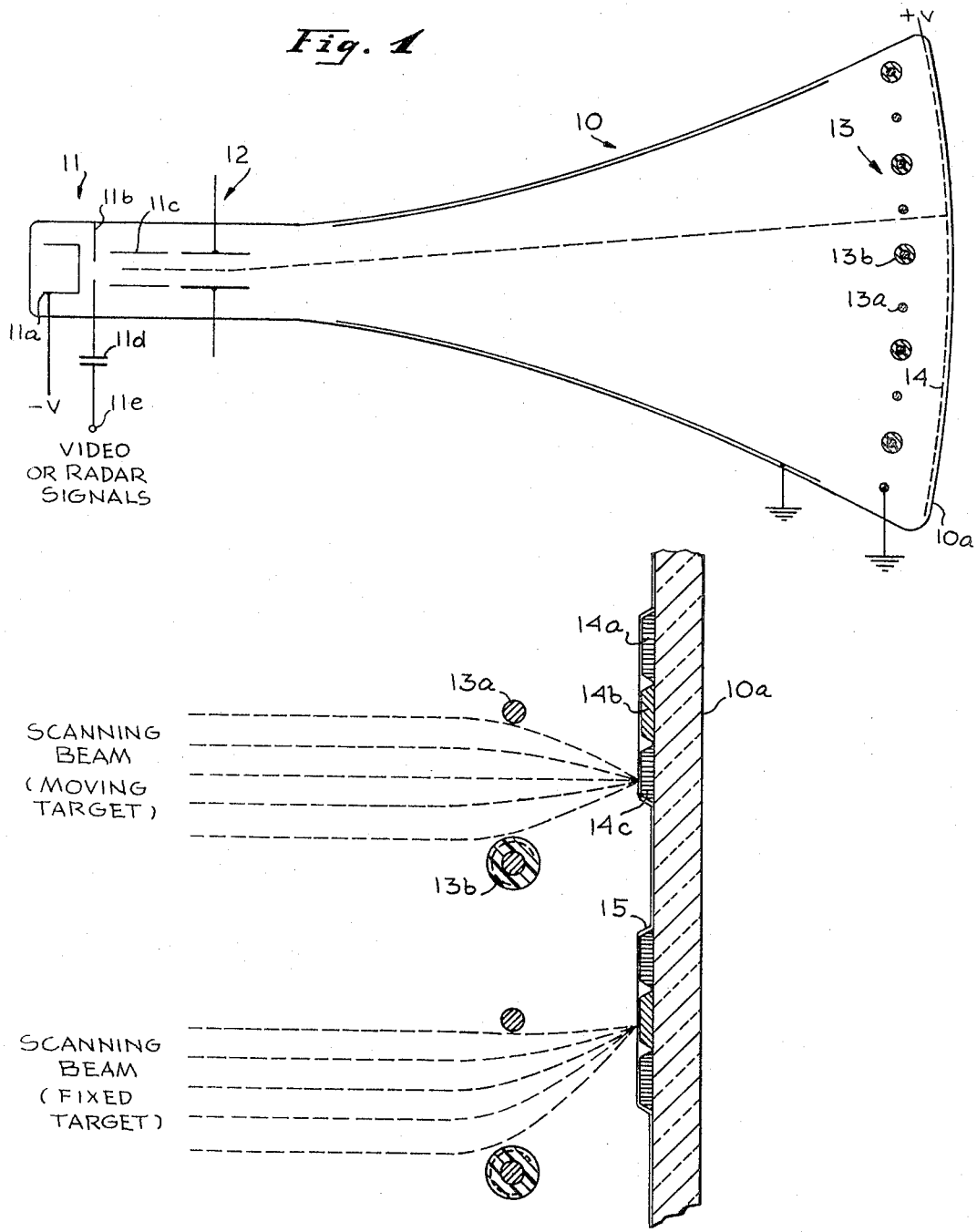

The present invention relates in general to radar systems and more particularly relates to a cathode-ray radar display tube.

In radar displays, it is obviously important to be able to distinguish between moving and fixed targets. For example, one of the difficulties in locating an approaching aircraft is that many echo pulses are received as a result of reflection from stationary objects such as buildings, hills, etc. which tend to mask or obscure the pulses reflected from the aircraft. This is particularly true if the aircraft is flying at a low altitude. Because of this masking effect of undesired reflected pulses, the effective range of the pulse-echo system is less than it would be otherwise.

It is, therefore, an object of the present invention to provide radar display apparatus that will visually distinguish between fixed and moving targets.

It is another object of the present invention to provide cathode-ray apparatus for a radar system that will facilitate the immediate visual separation of fixed and moving target displays.

It is a further object of the present invention to provide display apparatus for a radar system that will greatly reduce the masking or obscuring effect of pulses reflected from stationary objects.

It is a more specific object of the present invention to provide a new type of cathode-ray tube in which fixed radar targets are displayed in one color while moving targets are displayed in another color.

According to its basic concept, the present invention makes use of a charge storage action within the tube, the charge accumulated at stationary picture elements being different from the charge at elements which correspond to moving targets. Depending on the magnitude of the stored charge, a local deflection of the scanning beam is produced in the neighborhood of the phosphor screen which determines whether the electrons land on one or the other of two sets of phosphor strips having different emission colors.

More particularly, in a preferred embodiment of the invention, the cathode-ray tube includes a conventional type of electron gun and deflection system. However, at the viewing end of the tube, a grid of fine parallel wires is provided near the phosphor screen. Alternate wires are coated with an insulating layer and the wires are placed in registry with a set of aluminized phosphor strips provided on the glass faceplate, the phosphor strips being of the kind that will emit respectively different colors when activated. Because of the potential applied between the grid wires and the aluminized phosphor coating, a lens action is created with the result that the cathode-ray beam is focused to a narrow spot at the phosphor screen.

Assuming that the insulating coating on alternate wires is at the same potential as the bare wire mesh, the focusing action will cause the electron beam at all positions to converge and strike the phosphor strip that produces one of the two colors. This corresponds to the situation where a moving target is involved. In the case of a stationary or fixed target, however, in which case the same picture element is bombarded on several successive scans or frames, the insulating layer will charge to a considerably higher negative potential. A deflection field of sufficient magnitude will thus be produced between the insulator-coated wire and the adjacent bare wire to cause the converged electron beam to be deflected onto the phosphor strip that emits the second color. As a result, the observer can determine from the output color whether a particular picture element had been bombarded during the last few scans or whether it is being newly bombarded, that is to say, in this manner the observer can, by immediate observation, determine which targets are moving.

FIGURE 1 shows a cross-section of a display tube according to the present invention; and FIGURE 2 illustrates the scanning beam corresponding to two different conditions, namely, the conditions involving fixed and moving targets.

Considering now the invention in detail, reference is made to the drawing wherein like or similar parts are given like or similar designations in the figures. In FIG. 1, the embodiment is shown to include a cathode-ray tube whose glass envelope 10 contains an electron gun arrangement, generally designated 11, for producing and focusing a beam of electrons. Arrangement 11 is conventional and, therefore, its details are not shown. Suffice it to mention, therefore, that arrangement 11 includes the usual cathode 11a, control electrode 11b, as well as accelerating and focusing electrode 11c. As shown, control electrode 11b is coupled through a coupling capacitor 11d to a terminal 11e to which video or radar signals are applied for turning the electron beam either on or off. In addition, the cathode-ray tube includes the usual beam deflection system, generally designated 12, made up of a pair of vertical plates connected to a horizontal sweep generator and a pair of horizontal plates connected to a vertical sweep generator. For sake of simplicity, which is made possible by the fact that beam-deflection systems are so well known, the sweep generators are not shown and the deflection plates mentioned are only representatively illustrated.

At the viewing end of the tube, in the proximity of its faceplate which is designated 10a, there is provided a grid of fine parallel wires generally designated 13. The grid wires are alternately bare and coated with an insulating layer, and the wires are placed so as to be in registry with a set of phosphor strips 14 provided on the glass faceplate. The bare grid wires are designated 13a whereas the insulator-coated wires are designated 13b. One material that may be used as an insulator coating is barium titanate ($BaTiO_3$) powder held together with a suitable binder material. Different kinds of binder materials are available, such as plastic and organic binders. It should be mentioned, however, that organic bonders are generally unsuited for vacuum tube fabrication and, therefore, it is proposed that the metal wires be coated with barium titanate powder in a glass frit similar to that employed for electroluminescent powders. By proper proportioning of the barium titanate powder and the binder material, the desired value of dielectric constant can be obtained.

As for phosphor strips 14, reference is made to FIG. 2 wherein the phosphor strips are shown in greater detail. As shown therein, each strip 14 is made up of three smaller strips, 14a, 14b and 14c, strips 14a and 14c being of a kind that will emit light of one color and strip 14b being of a kind that will emit light of a contrasting color. In the figure, 14a and 14c designate green-emitting strips, whereas 14b designates a blue-emitting strip. However, other colors that contrast with each other may be used just as well. It will be noted from the figure that blue phosphor strips 14a and 14c are positioned substantially midway between wires 13a and 13b while the green phosphor strips are respectively aligned with wires 13a. Phosphor strips 14 are coated with an aluminized layer 15 that is maintained at a high positive potential relative to grid 13, with the result that, due to this potential difference, cylindrical lenses are formed that converge the electron beam to narrow lines.

Considering now the operation, when an echo pulse is received from a target, a corresponding pulse is applied at video or radar signal input 11e and, in response thereto, the scanning electron beam is gated "ON" and is thereby permitted to pass through electrode 11b to the wire grid and phosphor strips beyond. In the case of a fixed target, a pulse will be applied to terminal 11e at the same time during each scan with the result that the electron beam will impinge upon the same element each time. On the other hand, in the case of a moving target, a pulse will be applied to the terminal at different times during successive scan periods or frames with the result that here the electron beam will respectively impinge upon different elements.

It should be mentioned at this point that during the time that the scanning beam excites the phosphor, it also bombards the local insulating surface of the corresponding wire or wires and, depending on the insulating material and the accelerating voltage chosen, the surface of the insulator will charge either positively or negatively by secondary emission action. For the present discussion, it is assumed that the insulator is bombarded above its second crossover so that it tends to charge negatively. It is further assumed that the capacity of the insulating layer per unit length of wire and the magnitude of the secondary emission ratio are such that with a given beam current and time of bombardment, the charging of the insulator is relatively small in a single frame time. In addition, in order to prevent a gradual charging of all picture elements by integration over an extended period of time, it is also assumed that the insulating coating has sufficient leakage so that within a period of several frame times, the insulator surface of an unbombarded element of the wire discharges to the wire potential. In this way, a particular picture element will not be fully charged or show a color change to green unless it is bombarded on successive frames.

For purposes of illustration, a scanning beam corresponding to two conditions is shown in FIG. 2. The upper beam position corresponds to a moving target and, therefore, to the excitation of a picture element that had not been bombarded during the previous several frames. Because of the leakage of the insulating coating on the wire, the insulator surface potential is substantially equal to the wire potential, with the result that the focusing action is such that the converged electron beam strikes the green phosphor strips 14c. During the next scan period and for the reasons mentioned, the electron beam will strike another green-emitting phosphor strip 14c located elsewhere on the faceplate. It is thus seen that insofar as moving targets are involved, the color seen on the face of the tube is green.

However, in the case of a stationary or fixed target, in which case the same picture element is bombarded by the electron beam during several succesive frames, the insulating layer included in that picture element charges considerably more negative. As a result, a deflection field of sufficient magnitude is produced between the insulator-coated wire 13b and the adjacent bare wire 13a to cause the converged electron beam to be deflected onto a green phosphor strip 14b. In other words, for fixed targets, green light is emitted from the face of the display tube. Consequently, the observer can determine from the output color whether a particular picture element had been bombarded during the last few scans or whether it is being newly bombarded, that is to say, the observer can quickly determine whether or not a target is moving.

Although a particular arrangement of the invention has been illustrated and described by way of example, it is not intended that the invention be limited thereto. Thus, for example, aside from the initial choice of insulator or binder material to obtain the proper bulk resistivity, it is also possible to decrease the resistivity of the insulator by heating it. Actual heating of the insulator can be accomplished by passing a current through the grid wires. A relatively low voltage is required for this purpose, thus avoiding interference with the other functions of the tube. Again by way of example, a plate with holes through it can be used instead or in place of a wire mesh with the insulator material coating a portion of the edges of selected holes. At the same time, there would be provided dual-color emitting phosphor dots in registry with these holes. It is thus seen that the invention should be considered to include any and all modifications, alterations or equivalent arrangements falling within the scope of the annexed claims.

Having thus described the invention, what is claimed is:

1. In a cathode-ray type of display tube, the combination comprising: a substantially planar grid positioned substantially parallel to the faceplate of the tube and including a plurality of parallel linear charge storage elements each including insulating material and a conductive portion on which said insulating material is arranged, and a plurality of parallel linear non-storage elements in the form of bare conductors arranged between said storage elements and spaced therefrom; and a plurality of picture elements mounted on the inside surface of the tube faceplate, each of said picture elements including three color-emiting phosphor strips, the center strip emitting light of one color and the two outside strips emitting light of another color, said center strip being mounted in substantial alignment with the non-storage element in front of it and the two outside strips being mounted on either side of said non-storage element substantially midway between it and the adjacent charge storage elements.

2. In a cathode-ray type of display tube, the combination comprising: a phosphor screen deposited on the faceplate of the tube, said phosphor coating comprising a plurality of color-emitting picture elements each of which includes three phosphor strips, the center strip in each element emitting one color when subjected to electron bombardment and the two outside strips emitting another color when subjected to electron bombardment; and means including a wire mesh mounted in front of said phosphor screen with the alternate wires thereof coated with an insulating material, said insulating material being such that it will charge to a predetermined potential and discharge to the potential of the bare wire therebeneath only after several electron beam scan intervals, the bare mesh wires respectively being aligned with the center phosphor strips in said picture elements.

3. In a radar system, a cathode-ray type of display tube to visually indicate whether or not targets are moving or fixed in position, said tube comprising: electron-gun means for projecting an electron beam toward the tube faceplate in response to an echo pulse from a target; means including a wire mesh mounted in front of the tube faceplate and substantially parallel thereto, said mesh including alternately bare and insulator-coated wires with the insulative coatings respectively storing negative charge for a period of time when bombarded by the electron beam, said insulative coatings being such that they will respectively charge to a predetermined potential and discharge to the potential of the wires therebeneath only after several beam scan intervals, an aluminized phosphor coating on the faceplate surface facing said wire mesh, said phosphor coating being divided into a plurality of picture elements having three color-emitting phosphor strips each, the center strip in said picture elements respectively being aligned with the bare wires in said mesh and responsive to electron bombardment to emit light of one color, the strips on either side of the center strips being substantially midway between the bare and insulator-coated wires and responsive to electron bombardment to emit light of another and contrasting color; and means for applying a voltage between the wire mesh and the aluminum layer of sufficient magnitude to produce a lens action that focuses the electron beam to a narrow spot on the phosphor screen.

References Cited

UNITED STATES PATENTS

| | | | |
|---|---|---|---|
| 2,872,612 | 2/1959 | Delano | 315—1 |
| 2,989,742 | 6/1961 | Johnson | 315—12 |
| 3,067,415 | 12/1962 | Downes | 343—7. |

JOHN W. CALDWELL, *Acting Primary Examiner.*

T. A. GALLAGHER, *Assistant Examiner.*